Aug. 12, 1969 T. A. HANSEN 3,461,313
CIRCUIT FOR MAINTAINING SELECTED CIRCUITS OPERATED
Filed Dec. 9, 1965
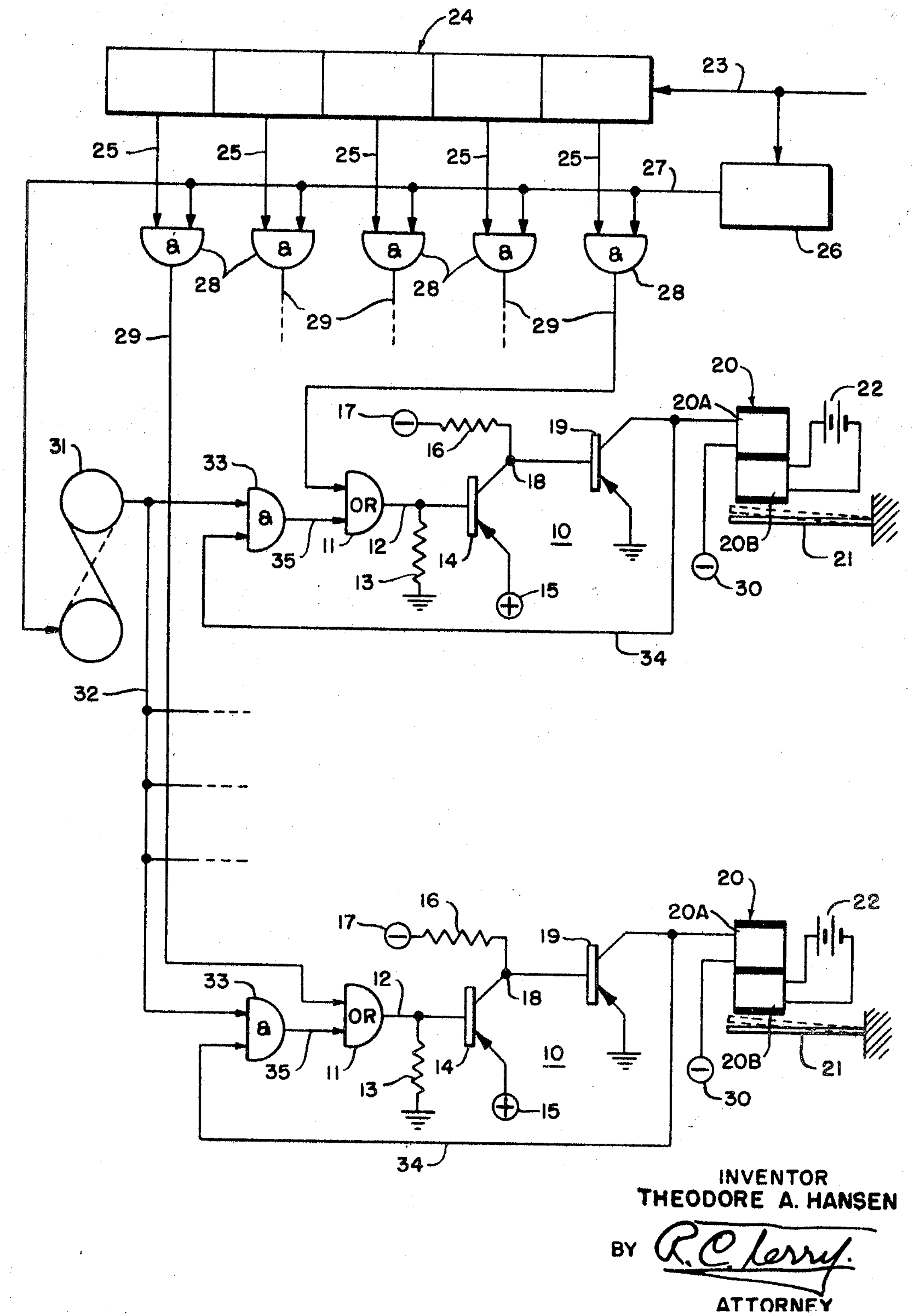
INVENTOR
THEODORE A. HANSEN
BY R. C. Perry
ATTORNEY United States Patent Office 3,461,313
Patented Aug. 12, 1969

3,461,313
CIRCUIT FOR MAINTAINING SELECTED CIRCUITS OPERATED

Theodore A. Hansen, Park Ridge, Ill., assignor to Teletype Corporation, Skokie, Ill., a corporation of Delaware Filed Dec. 9, 1965, Ser. No. 512,701
Int. Cl. H03k 5/20
U.S. Cl. 307—231 2 Claims

ABSTRACT OF THE DISCLOSURE

A telegraph receiving circuit in which a serial signal is fed into a shift register until a complete code combination fills the shift register, at which time a timing signal is sent to a plurality of coincidence gates which pass signals from each stage of the shift register that is in one predetermined binary state to an associated individual operating circuit, thereby energizing those operating circuits associated with a bit of the received telegraph code combination that is of the predetermined binary state. The timing signal also triggers a monostable multivibrator to its quasistable state, thereby supplying a timed input signal to each operating circuit. A feed-back path in each operating circuit combines with the signal from the monostable multivibrator to maintain an individual operating circuit energized for the duration of the period of the monostable multivibrator.

This invention relates to electronic circuits and more particularly to circuits for maintaining selected ones of a plurality of circuits in an operated condition.

In telegraph apparatus it is often desirable to provide identical operating instrumentalities for each level of a code being transmitted or received. Often selected ones of these instrumentatlities must be operated during a very short interval of time and then the selected ones must be held operated over an extended period of time. If the instrumentalities comprise electrical circuits this can often be accomplished by including pulse stretching circuitry, which is triggered by an input pulse of short duration and which then remains operated for a predetermined period of time, in each of the individual circuits. This, however, is costly since it requires that pulse stretching circuitry be provided for each level of the code being transmitted or recorded.

Accordingly, an object of this invention is to reduce the cost of maintaining selected ones of a plurality of circuits operated.

Another object of the invention is to provide a circuit employing only one timing element for maintaining selected ones of a plurality of circuits in an operated condition.

According to the preferred embodiment of the invention these and other objects of the invention are achieved by applying the outputs of a receiving distributor individual to a plurality of identical operating circuits equal in number to the levels of the code received and simultaneously starting a monostable multivibrator. A plurality of AND-gates each individual to one of the operating circuits and each having one of its inputs connected to the output of the monostable multivibrator and having the other of its inputs connected to the output of the operating circuit individual to it are provided. The outputs of the AND-gates are connected to the inputs of their individual operating circuits so that the operating circuits, once triggered by the receiving distributor, will remain operated for a period of time equal to the period of the monostable multivibrator.

A more complete understanding of the invention may be had by referring to the following detailed description when taken in conjunction with the drawing wherein there is shown a schematic illustration of a circuit employing the present invention.

Referring now to the drawing there is shown a circuit for maintaining selected ones of a plurality of operating circuits 10 in an operated condition for a predetermined period of time once they have been triggered into operation. The operating circuits 10 shown in the drawings are intended for use in conjunction with the intelligence recording apparatus described and claimed in W. J. Zenner Patent No. 3,056,546, granted Oct. 2, 1962. It should be understood, however, that the operating circuits 10 may be used with minor modifications in conjunction with any desired recording apparatus and that the present invention can be employed with operating circuits other than those described. Although only two operating circuits 10 are shown in the drawing it should be noted that an individual operating circuit 10 must be provided for each level of the code being received.

In the starting or normal condition there is no output from an OR-gate 11 individual to each of the operating circuits 10 and accordingly, the output lead 12 of each of the OR-gates 11 is maintained at nearly ground potential through a resistor 13. This causes the potential applied to the base of a transistor 14 to be more negative than potential applied to the emitter of the transistor since the emitter is maintained at a positive potential by a source of positive potential 15. As a result, the transistor 14 is rendered conductive and current is passed from the source of positive potential 15 through the transistor 14 and a resistor 16 to a source of negative potential 17. This causes the potential at a point 18 connected to the collector of the transistor 14 to be nearly equal to the value of the positive potential 15.

The maintenance of the point 18 at a positive potential keeps the base of a transistor 19 at a positive potential and, therefore, renders the transistor 19 nonconductive since the emitter of the transistor 19 is connected to ground. Accordingly, no current flows to a secondary winding 20A of a differential electromagnet 20. This in turn causes the differential electromagnet 20 to keep its armature 21 in an attracted position as shown in dotted lines of the drawing due to the direct connection of a battery 22 to the primary winding 20B of the electromagnet 20.

Operation of the circuit shown in the drawing commences with the reception of a character signal over a telegraph line 23 which is received in serial fashion from a remote sending device such as a tape transmitter, a keyboard transmitter, etc. The telegraph line 23 is connected to a receiving distributor 24 which may be of any of the well known types and which operates to transform the signal received from a serial mode to a parallel mode. That is, the receiving distributor 24 receives a character from the remote device and impresses on its output leads 25 a permutation combination of marking and spacing bits depending on the particular character received from the remote transmitting device. The receiving distributor 24 and all of the logic elements disclosed herein should be considered as having an output capable of driving the circuit element to which they are connected whenever they are in a marking or on condition and as having no output capable of driving the circuit element to which they are connected whenever they are in a spacing or off condition.

Also connected to the telegraph line 23 is a timer 26 which emits a sample pulse of short duration on its output lead 27 at the end of each character received. The timer 26 may be of any of the types well known in the art. The output leads 25 of the receiving distributor 24 each comprise one input to a plurality of AND-gates 28 each individual to one level of the code being received. The other input to the AND-gates 28 is connected to the output lead 27 of the timer 26. When the timer 26 emits a sample pulse following reception of a complete character the AND-gates 28 will emit a pulse on their output leads 29 if the character received by the receiving distributor 24 has a marking bit in the level corresponding to the levels to which the AND-gates 28 are individual and will not emit a pulse on their output leads 29 if the level of the character being received to which they are individual is in a spacing condition. Thus, the output leads 29 of the AND-gates 28 will, at the time the timer 26 emits a sample pulse contain the signal received by the receiving distributor 24 in the form of a permutation combination of outputs and no outputs on the leads 29.

When an input pulse is received by the OR-gate 11 from the AND-gate 28 individual to the operating circuit in which the OR-gate 11 is included the OR-gate 11 is triggered thereby and emits a positive output on its output lead 12. The output of the OR-gate 11 is of greater positive potential than is the source of positive potential 15. The output of the OR-gate 11 is directly applied to the base of the transistor 14 due to the resistor 13 and, since it is of greater positive potential than is the source of positive potential 15, the transistor 14 is rendered nonconductive. When the transistor 14 becomes nonconductive, the point 18 is driven to a negative potential almost equal to the value of the negative source of potential 17 since the positive potential 15 is no longer being applied to the collector of the transistor 14. The base of the transistor 19 is thus driven to a potential more negative than the potential of the emitter of the transistor 19 which is maintained at ground. This renders the transistor 19 conductive which in turn allows current to pass from ground through the transistor 19 and through the secondary winding 20A of the differential electromagnet 20 to a source of negative potential 30.

The presence of current in the secondary winding causes the generation of flux opposite in direction to the flux generated by the primary winding 20B. The net flux effect on the armature 21 is thereby made zero which in turn allows the armature 21 to move away from the differential magnet 20 toward its normal position. As is described in the above-mentioned Zenner Patent No. 3,056,546, this causes a punch pin, which is connected to the armature 21, to be driven through a piece of paper tape. By connecting one of the operating circuits 10 to each of the outputs 25 of the receiving distributor 24 through the triggering circuitry comprised of the timer 26 and the AND-gates 28 the character received by the receiving distributor can thereby be transformed from an incoming electrical signal into a permanent record in a paper tape.

It should be understood that the characters received by the receiving distributor 24 over the telegraph line 23 normally follow each other in rapid succession. For this reason an individual one of the characters received is not normally present in the receiving distributor 24 long enough to effect complete operation of the operating circuits 10 and the punching apparatus controlled thereby. Therefore, some manner of lengthening the output of the AND-gates 28 as controlled by the outputs of the receiving distributor 24 and the timer 26 is necessary.

In addition to controlling the operation of the AND-gates 28 the timer 26 initiates operation of a monostable multivibrator 31 once for each character received over the telegraph line 23. The monostable multivibrator 31 is a timing device which once started, maintains a pulse on its output for a predetermined period of time depending upon the characteristics of the particular monostable multivibrator.

The output of the monostable multivibrator 31 is connected to a lead 32 which in turn is connected to one of the inputs to each of a plurality of AND-gates 33 which are in turn each individual to one of the operating circuits

10. The other input to each of the AND-gates 33 is obtained from a lead 34 connected to the collector of the transistor 19 in the respective operating circuit 10. The AND-gates 33 emit an output on their output leads 35 only when a signal is present on all of their inputs. Accordingly, when any of the operating circuits 10 is started by receipt of a trigger pulse from the AND-gate 28 individual to it, the operating circuit 10, in the manner hereinbefore described, will cause a signal to be applied on the collector of its transistor 19. Since the AND-gates 28 are only operated upon receipt of a pulse from the timer 26 and since such a signal also starts the monostable multivibrator 31, an output is always present on lead 32 whenever there is output on leads 29 from the AND-gates 28. Accordingly, once started by a signal from the AND-gates 28, each of the individual operating circuits 10 is maintained operated by the combination of a signal on the lead 34 from its output and a signal on the lead 32 from the monostable multivibrator 33. The presence of these two signals at the inputs of the AND-gate 33 individual to the circuit 10 causes an output to be emitted on the output lead 35 by an AND-gate 33 which in turn acts as an input for the OR-gate 11 and maintains the operating circuit 10 operated.

Any of the operating circuits 10 connected to an AND-gate 28 corresponding to a level of the character received which is spacing will not be originally started since no input to the AND-gate 28 is supplied over the lead 25 and therefore no output will be emitted on the lead 29 of the AND-gate 28 at the time the timer 26 emits the pulse on the lead 27. Since the circuit 10 individual to a level of the code which is spacing is never started, there is never a pulse on the lead 34 extending from the output of the circuit which can combine with the pulse on the lead 32 from the monostable multivibrator 31 to operate the AND-gate 33 and thus maintain the circuit 10 operated. Accordingly, if the circuit 10 is not started by a trigger pulse from an AND-gate 28, it cannot thereafter be started by the circuit maintenance circuitry comprised of the monostable multivibrator 31 and the individual AND-gates 33.

Although only one embodiment of the invention is shown in the drawing and described in the foregoing specification, it will be understood that invention is not limited to the specific embodiment described, but is capable of modification and rearrangement, and more particularly of substitution of different logic elements for the ones disclosed, without departing from the spirit of the invention.

What is claimed is:

1. A circuit for maintaining selected ones of a plurality of individual circuits in an operated condition for a predetermined period of time including:
   - a receiving distributor for receiving signals in serial form and for converting the received signals to parallel form;
   - a timer for producing a single output signal once for each character received by the receiving distributor;
   - a plurality of coincidence gates each having the output of the timer connected to one of its inputs, having the output of one level of the receiving distributor connected to the other of its inputs and having its output connected to the input of one of the individual circuits for simultaneously initiating the operation of selected ones of the individual circuits in accordance with the character received by the receiving distributor when the timer produces an output;
   - timing means having its input connected to the timer and responsive thereto to produce a steady output signal for a predetermined period of time once for each character received; and
   - means responsive to the output of the timing means and to the output of the individual circuits to maintain the selected ones of the individual circuits operated as long as the timing means produces an output signal.

2. A circuit for maintaining selected ones of a plurality of individual circuits in an operated condition for a predetermined period of time comprising:

a receiving distributor for receiving a signal character in serial form and for converting the received signal to parallel form;

a timer for producing an output once for each character received by the receiving distributor;

a plurality of first coincidence gates each having the output of the timer connected to one of its inputs, having the output of one level of the receiving distributor connected to the other of its inputs and having its output connected to the input of one of the individual circuits for initiating the operation of selected ones of the individual circuits in accordance with the character received by the receiving distributor when the timer produces an output;

a monostable multivibrator having a period equal to the predetermined period of time, having its input connected to the timer so that it is operated once for each character received; and a plurality of second coincidence gates each individual to one of the individual circuits and each having the output of the monostable multivibrator for one of its inputs, having the output of its individual circuit for the other of its inputs and having its output connected to the input of its individual circuit, thereby causing the selected ones of the individual circuit to remain operated for the predetermined period of time.

References Cited

UNITED STATES PATENTS

| | | | |
|---|---|---|---|
| 2,592,308 | 4/1952 | Meacham | 179—43.5 |
| 3,075,091 | 2/1960 | Homan | 307—88.5 |
| 3,266,032 | 8/1966 | Bühler | 340—286 |
| 3,283,255 | 11/1966 | Cogar | 328—99 |

ARTHUR GAUSS, Primary Examiner

R. C. WOODBRIDGE, Assistant Examiner

U.S. Cl. X.R.

307—247, 273; 328—119, 153